June 30, 1942. G. H. NYSTROM 2,287,820
CONVERGENT RAYS SAFETY LENS
Filed Nov. 7, 1940 3 Sheets-Sheet 1

Inventor
Gustaf H. Nystrom
By Lacey & Lacey,
Attorneys

Inventor
Gustaf H. Nystrom
By Lacey & Lacey
Attorneys

June 30, 1942. G. H. NYSTROM 2,287,820
CONVERGENT RAYS SAFETY LENS
Filed Nov. 7, 1940 3 Sheets-Sheet 3
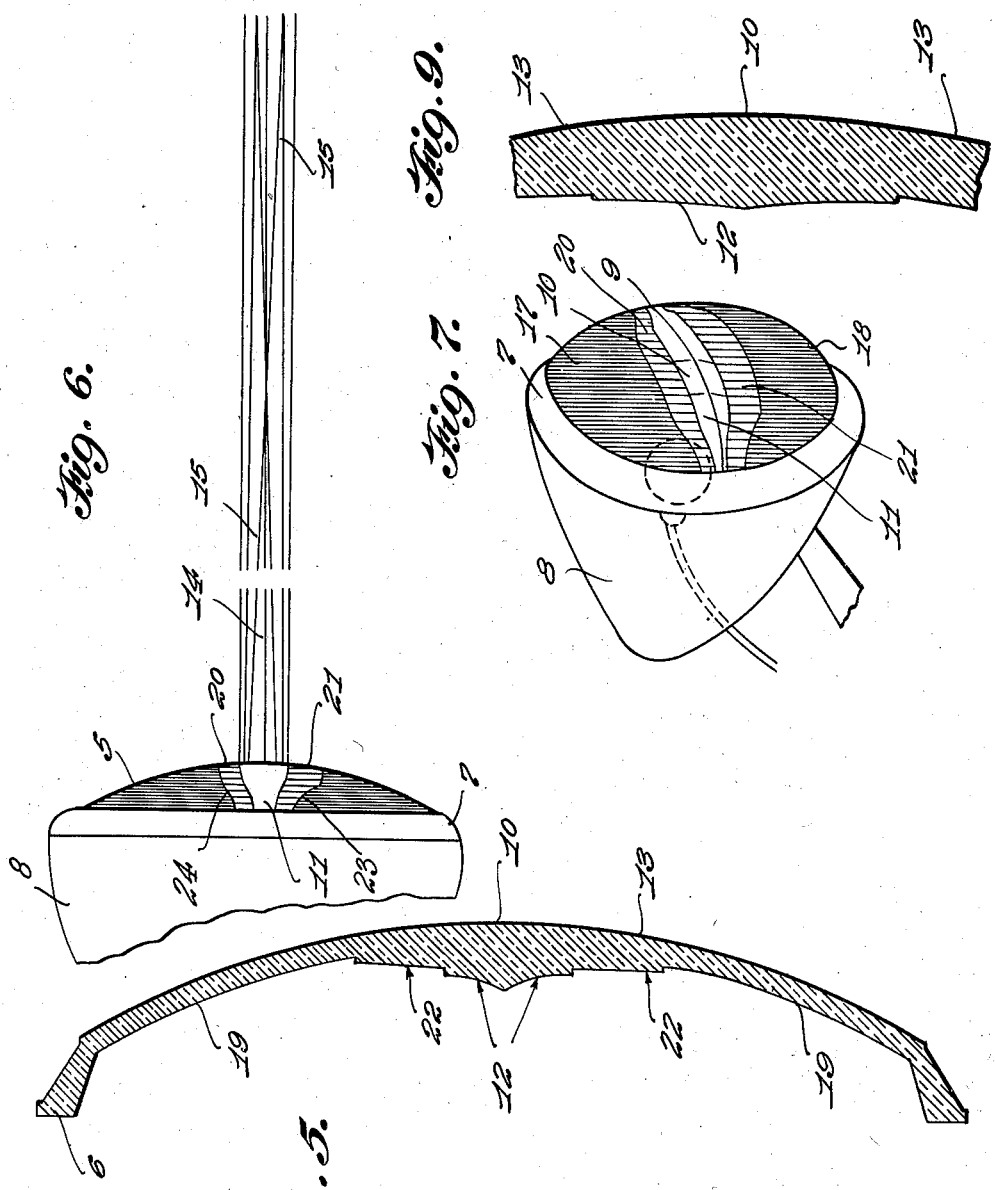
Inventor
Gustaf H. Nystrom
By Lacey & Lacey
Attorneys Patented June 30, 1942

2,287,820

UNITED STATES PATENT OFFICE 2,287,820

CONVERGENT RAYS SAFETY LENS

Gustaf H. Nystrom, Columbus, Ohio

Application November 7, 1940, Serial No. 364,717

5 Claims. (Cl. 240—41.4)

This invention relates to lenses and more particularly to a convergent rays safety lens especially designed for use on the headlights of automobiles, locomotives, airplanes and other vehicles.

The object of the invention is to provide a lens, the construction of which is such that light rays therefrom will more effectually illuminate the path of a vehicle in atmospheric conditions which reduce visibility than heretofore possible, and at the same time produce long distance nonglaring illumination which will reduce the liability of collision or accident.

A further object is to form the lens with upper and lower zones having relatively narrow vertical flutes for producing a subdued light and intermediate zones or fields disposed directly above and below the horizontal prismatic field and having relatively wide vertical flutes for producing light rays of greater intensity.

A further object is to terminate the flutes at the opposite ends of the intermediate zones on curved lines extending toward the periphery of the lens so as to increase the spread of light rays and thus illuminate objects at the opposite sides of the roadway, particularly when the vehicle is making a turn.

A still further object of the invention is generally to improve this class of devices so as to increase their utility, durability and efficiency.

Figure 1:
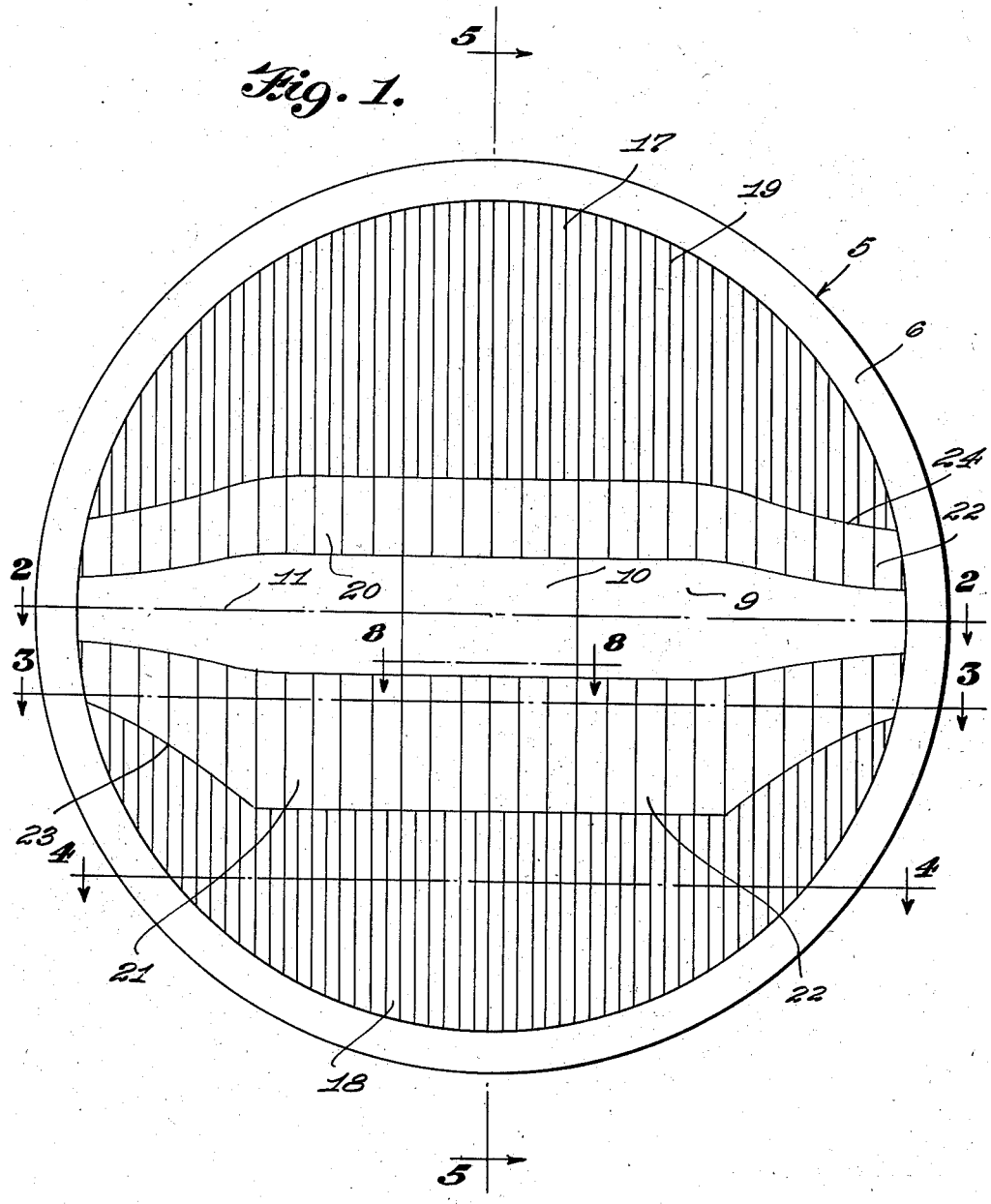
Figure 2:
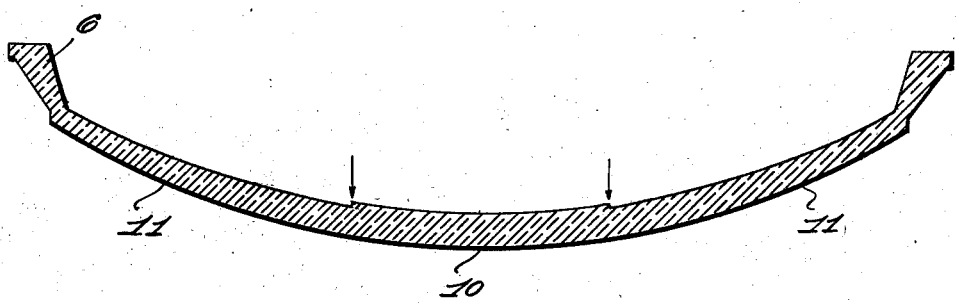
Figure 3:
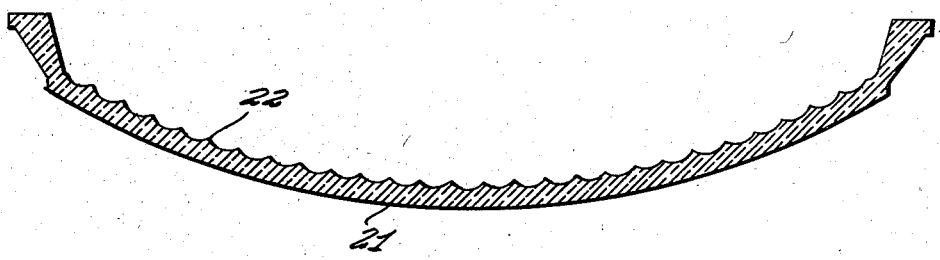
Figure 4:
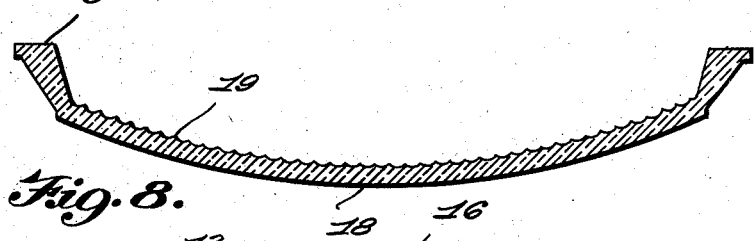
Figure 8:
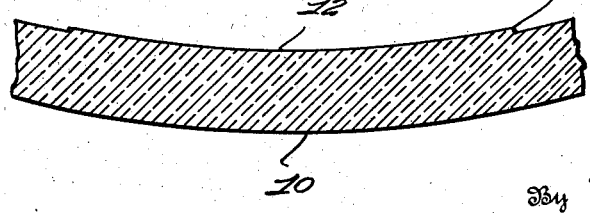

In the accompanying drawings forming a part of this specification and in which similar numerals of reference indicate corresponding parts in all the figures of the drawings:

Figure 1 is a front elevation of a convergent rays safety lens embodying the present invention, Figure 2 is a transverse sectional view taken on the line 2—2 of Figure 1, Figure 3 is a similar view taken on the line 3—3 of Figure 1, Figure 4 is a transverse sectional view taken on the line 4—4 of Figure 1, Figure 5 is a vertical sectional view taken on the line 5—5 of Figure 1, the proportions of the central part of the lens being exaggerated to more clearly show the construction thereof, Figure 6 is a side elevation showing how the upper and lower rays of the central prismatic field converge and blend into the horizontal light beam, Figure 7 is a perspective view of the lens showing the same mounted in an automobile headlight casing, the electric bulb being indicated in dotted lines, Figure 8 is an enlarged transverse sectional view taken on the line 8—8 of Figure 1, and Figure 9 is an enlarged detail vertical sectional view of the lens at the central prismatic field thereof.

In carrying the invention into effect, I provide a lens 5 preferably concavo-convex in cross section and circular in marginal contour, said lens being formed with a peripheral flange 6 adapted to fit into a retaining ring 7 mounted on the casing 8 of an automobile headlight. The lens 5 is molded or otherwise formed with an intermediate horizontally disposed prismatic field 9 which extends entirely across the lens and is devoid of flutes or other surface projections which would tend to minimize the light rays. The central portion 10 of the prismatic field is substantially rectangular in shape while the side portions 11 extend therefrom to the flange 6, as shown. The central portion 10 of the horizontal field is prismatic in cross section, as best shown in Figure 9 of the drawings, with the inclined faces 12 on the inner surface of the lens so as to produce a central horizontal beam 14 and upper and lower converging rays 15. The upper and lower converging rays 15 intersect the horizontal beam 14 at a point a considerable distance in advance of the lens and then extend upwardly and downwardly in opposite directions so as to blend into the central beam and effectually illuminate the road under inclement weather conditions without presenting a glaring or blinding light to the driver of an approaching vehicle.

The side portions 11 are also prismatic in cross section and gradually decrease in thickness from the central portion 10 to the rim of the lens, the difference in the thickness of the glass defining a shoulder 16, as best shown in Figure 8.

The lens is provided with upper and lower zones 17 and 18 and the inner or concave face of the lens at said zones is formed with a plurality of relatively narrow vertical flutes 19 which serve to produce a subdued light on opposite sides of the central light beam. Interposed between the horizontal prismatic field 9 and the upper and lower zones 17 and 18 are upper and lower intermediate transverse zones 20 and 21 provided with wider vertical flutes 22 which produce light rays of greater intensity than the zones 17 and 18 and which light rays cooperate with the central beam and converging light rays to effectually illuminate the roadway in advance of the lens.

The upper ends of the vertical flutes of the lower zone 18 at opposite sides of the lens are curved upwardly in the direction of the rim of the lens, as indicated at 23, and the lower ends of the vertical flutes of the upper zone 17 are likewise inclined or curved in the direction of the periphery of the lens, as indicated at 24. These curved portions 23 and 24 serve to spread the light laterally and thus illuminate objects at the side of a road, particularly when the vehicle is making a turn. The vertical flutes 19 of the upper and lower zones 17 and 18 are preferably of the same width and thickness while the vertical flutes 22 of the intermediate zones 20 and 21 are not only preferably wider than the vertical flutes 19 but gradually increase in thickness from the flutes 19 to the central horizontal prismatic field. This gradual increase in the thickness of the vertical flutes of the lower zone 21, however, is very slight, amounting in actual practice to an increase in glass thickness of not more than one-sixty-fourth of an inch at the junction of the flutes with the prismatic field, so as to provide an illumination straight ahead of a vehicle far enough for comfort and safe driving. The more powerful long distance rays, particularly the downwardly directed rays, coming from the upper part of the central or prismatic zone 9, tend to sweep over and cut out any less powerful rays above a certain height over the ground and in so doing eliminate glare to the driver of an approaching vehicle.

It will thus be seen that the central transverse zone of the lens will produce a concentrated beam of light while the upper and lower zones of the lens will produce a subdued light which merges into the light rays of the central zone.

It will, of course, be understood that the lens may be made in different sizes and shapes and formed of white, amber or any desired color glass or other transparent or translucent material without departing from the spirit of the invention.

Having thus described the invention, what is claimed as new is:

1. A lens having an intermediate horizontally disposed prismatic zone the central portion of which comprises two horizontal surfaces inclined toward each other to form an apex at the central transverse axis of the lens and being substantially rectangular in shape to produce a horizontal light beam and upper and lower converging light rays intersecting said beam, and lateral portions on opposite sides of the rectangular portion extending in the direction of the rim of the lens and gradually reduced in thickness from the rectangular portion to said rim, said prismatic zone being free from flutes, and vertical flutes disposed above and below the prismatic zone for producing light rays of subdued intensity.

2. A lens having an intermediate horizontally disposed prismatic zone the central portion of which comprises two horizontal surfaces inclined toward each other to form an apex at the central transverse axis of the lens and being substantially rectangular in shape to produce a horizontal light beam and upper and lower converging light rays intersecting said beam, and lateral portions on opposite sides of the rectangular portion having their upper and lower edges converging in the direction of the rim of the lens and gradually reduced in thickness from the rectangular portion to said rim, said prismatic zone being free from flutes, and vertical flutes disposed above and below said prismatic zone for producing light rays of subdued intensity.

3. A lens having a central horizontally disposed prismatic zone, the central portion of which comprises two horizontal surfaces inclined toward each other to form an apex at the central transverse axis of the lens and being substantially rectangular in shape to produce a horizontal light beam and upper and lower converging light rays intersecting said beam, and lateral portions on opposite sides of the rectangular portion having their upper and lower edges converging in the direction of the rim of the lens and gradually reduced in thickness from the rectangular portion to said rim, said prismatic zone being free from flutes, top and bottom zones provided with vertical flutes, and intermediate zones having vertical flutes wider than the flutes of the top and bottom zones to spread the light laterally to a less extent than the flutes of said top and bottom zones.

4. A lens having a central horizontally disposed prismatic zone, the central portion of which comprises two horizontal surfaces inclined toward each other to form an apex at the central transverse axis of the lens and being substantially rectangular in shape to produce a horizontal light beam and upper and lower converging light rays intersecting said beam, and lateral portions on opposite sides of the rectangular portion extending in the direction of the rim of the lens and gradually reduced in thickness from the rectangular portion to said wall, said prismatic zone being free from flutes, top and bottom zones provided with vertical flutes, and intermediate zones disposed between the central horizontal zone and said top and bottom zones and having their end portions converging in the direction of the rim of the lens, said intermediate zones being provided with vertical flutes wider than the flutes of the top and bottom zones to spread the light laterally to a less extent than the flutes of the top and bottom zones.

5. A lens having a central horizontally disposed prismatic zones the central portion of which comprises two horizontal surfaces inclined toward each other to form an apex at the central transverse axis of the lens and being substantially rectangular in shape to produce a horizontal light beam, and lateral portions on opposite sides of the rectangular portion extending in the direction of the rim of the lens and gradually reduced in thickness from the rectangular portion to said rim, said prismatic zone being free from flutes, top and bottom zones provided with vertical flutes and upper and lower intermediate zones disposed on opposite sides of the central prismatic zone and having their end portions converging in the direction of the rim of the lens, the lower intermediate zone being wider than the upper intermediate zone and both intermediate zones being provided with vertical flutes wider than the flutes of the top and bottom zones to spread the light laterally to a less extent than the flutes of said top and bottom zones.

GUSTAF H. NYSTROM.